T. A. EDISON.
BATTERY TRAY.
APPLICATION FILED DEC. 13, 1915.
1,364,358. Patented Jan. 4, 1921.
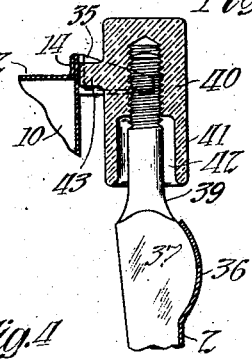
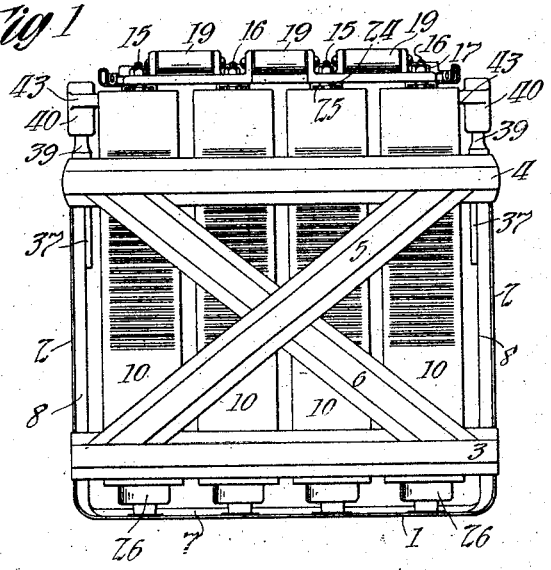

UNITED STATES PATENT OFFICE.

THOMAS A. EDISON, OF LLEWELLYN PARK, NEW JERSEY, ASSIGNOR TO EDISON STORAGE BATTERY COMPANY, OF WEST ORANGE, NEW JERSEY, A CORPORATION OF NEW JERSEY.

BATTERY-TRAY.

1,364,358.     Specification of Letters Patent.     Patented Jan. 4, 1921.

Application filed December 13, 1915. Serial No. 66,481.

*To all whom it may concern:*

Be it known that I, THOMAS A. EDISON, a citizen of the United States, and resident of Llewellyn Park, West Orange, Essex county, New Jersey, have invented certain new and useful Improvements in Battery-Trays, of which the following is a description.

My invention relates to an improved tray for supporting and securely holding together a group of battery cells, and to the combination of such a tray and any number of such battery cells supported thereby. By the use of my improved tray the assembling and handling of the cells are facilitated, and batteries of any desired number of such groups of cells may be conveniently made up of a number of such trays with their contained cells. Although my tray is designed particularly for use with storage battery cells of the Edison type, wherein an alkaline electrolyte is employed and the electrolyte and battery elements are contained in a metallic receptacle or containing can, it is to be understood that the same may be effectively utilized with other types of battery cells.

The principal objects of my invention are to provide a tray, preferably of metal, which shall be of great strength and durability and capable of withstanding great shocks and strains; and to provide an improved construction whereby the cells are rigidly held in the tray against all movement with respect thereto, and whereby the individual cells are spaced from and kept out of contact with the body of the tray and with each other, and are guarded from contact with other conducting bodies.

My invention also consists in a tray of simple construction, wherein the cells may be easily and quickly assembled with adequate spaces for ventilation and cooling provided on all sides of the cells, and in an arrangement whereby short circuiting of any of the cells by moisture or other matter which may be present from any cause, is prevented.

Other objects and features of my invention will be hereinafter more fully described and claimed.

For a clearer understanding of my invention, attention is directed to the drawing accompanying and forming part of this specification, in which the same reference characters are used throughout the several views to designate like parts, and in which:

Figure 1 is a view in side elevation of a battery tray with a group or series of four Edison storage battery cells supported therein in accordance with my invention;

Fig. 2 is a view in end elevation of the structure shown in Fig. 1;

Fig. 3 is a plan view thereof;

Fig. 4 is an enlarged detailed sectional view showing the means for securing a battery cell to and insulating the same from the bottom of the tray;

Fig. 5 is a similar view showing the means for insulating the cells from and maintaining the same in spaced relation to the walls of the tray; and Fig. 6 is a similar view of one of the composite members for rigidly connecting the upper end portions of the cells together in spaced relation.

My improved tray comprises a frame preferably composed of thin stiff nickel-plated sheet steel. The bottom 1 and end walls 2 of the tray are preferably formed of a single piece, as clearly shown in Fig. 1. The end walls 2 are rigidly connected at each side of the tray by means of lower and upper horizontal ribbed strips 3 and 4, the end portions of these strips being bent over and securely fastened, as by means of rivets, to the end walls 2. The lower side strips 3 are connected to the end walls 2 a considerable distance above the bottom of the tray. At each side of the tray the strips 3 and 4 are braced to thereby stiffen and strengthen the tray, by a pair of diagonal strips 5 and 6 suitably secured to each other where they cross and to the strips 3 and 4 at their ends, as by spot welding. The bottom 1 of the tray is stiffened by a central longitudinal upstanding rib or projection 7, which also has an additional function which will be hereinafter explained. Each of the end walls 2 is ribbed vertically as at 8 and horizontally as at 9 to stiffen and strengthen the same.

The drawing illustrates a group or series of four storage battery cells of the Edison type, having the usual metallic containing cans or receptacles 10, disposed side by side in spaced relation in the tray. The bottom 11 and top 12 of each battery can or container are welded to the sides of the container in such a manner as to provide flanges 13 and 14 extending beyond said bottom and top respectively. The battery cells are so arranged that the poles thereof at each side of the group are alternately negative and positive. The cells are rigidly secured together in spaced relation at their upper ends and electrically connected in series by means of a pair of parallel horizontal composite members, which are securely fastened at the sides of the group of cells to the poles 15 and 16 thereof, as by means of nuts 17. Each of these composite members comprises a plurality of flat heavy metallic bars 18 and a member or members 19 of suitable insulating material, preferably porcelain. Bars 18 of each of these composite members are provided at each pair of their adjacent ends with upstanding lugs or flanges 20 between which the insulating members are disposed, the lugs 20 being secured to such members, as by screws 21. Pieces 22 of soft rubber, or other cushioning material, are respectively disposed between the flanges or lugs 20 and the members 19. The bars 18 are provided with holes 23 receiving the poles 15 and 16, these holes preferably being punched in the bars so as to form downwardly projecting flanges 24 about the holes, as shown in Fig. 1. The flanges 24 respectively bear on insulating nuts 25 which are threaded on the poles 15 and 16 into tight engagement with the tops 12 of the battery cans 10, and serve to maintain the composite members, comprising the bars 18 and insulating members 19, in spaced relation to the battery cans, as clearly shown in Figs. 1 and 2. As the cells are electrically connected in series by the composite members, the bars 18 and insulating members 19 of the latter at the opposite sides of the group of cells will be in staggered relation, as shown in Figs. 1 and 3.

Each of the cells is supported from the bottom of the tray in spaced relation thereto, preferably by a pair of members or blocks 26 formed of insulating material, such as porcelain, which, as shown in Fig. 3, are disposed one on either side of the central upstanding rib or projection 7 of said bottom. As shown in Fig. 4, each of the blocks 26 comprises a body formed of an upper portion 27 and a lower portion 28 having substantially alined exterior surfaces, and a petticoat portion 29 extending laterally from said body between the portions 27 and 28 and disposed wholly beyond the latter. Consequently the petticoat portions 29 of the blocks 26 will be subjected to none of the weight of the cells or the strains imposed on the blocks by the tray and cells, and the liability of breaking such petticoat portions is therefore reduced to a minimum. The bottoms 11 of the cells are provided with plates 30 suitably secured thereto, as by spot welding. Each of the plates 30 has a screw 31 suitably secured thereto, with the threaded shank of the screw depending from the plate. The insulating blocks 26 are threaded on the shanks of screws 31 and thereby securely fastened to the bottoms of the cells 10. Each of the blocks 26 is also rigidly secured to the bottom 1 of the tray by means of a screw 32 threaded into the portion 28 thereof. The bottom of the tray is provided with an opening for each of the screws 32, and a struckup inwardly inclined flange 33 surrounding such opening and forming a seat for the head of the screw. Each of the blocks 26 is also provided at its lower end and about the opening for the screw 32, with an inclined seat for the corresponding flange 33. A ring or washer 34 of cushioning material, such as soft rubber, is disposed between each block 26 and the bottom of the tray and surrounds the corresponding flange 33. By the construction just described, the cells are rigidly secured to the bottom of the tray in such a manner that vertical movement of the cells in the tray and lateral movement of the lower end portions of the cells with respect to the tray will be prevented. Also, the lateral strains imposed on the blocks 26 are largely communicated to and taken up by the flanges 33 of the bottom 1 of the tray, and accordingly the danger of breaking these blocks is materially lessened. As clearly shown in the drawing, the arrangement of blocks 26 with respect to the tray is such that the cells will be held in the tray properly spaced from each other and the walls of the tray. The central longitudinal upwardly extending rib 7 in addition to stiffening the tray, tends to cause any liquid which may gather at the bottom of the tray to flow therefrom, and thereby prevents any considerable accumulation of such liquid in the tray.

A substantially rectangular bracket 35 is suitably secured to the upper end portion of the outer side wall of the can 10 of each end cell in the group of cells in the tray. Each end wall 2 of the tray is formed with an outwardly curved portion 36 at its upper end, and a pair of spaced vertical members 37 provided with portions fitting the curved portion 36, are rigidly secured, as by means of rivets 38, to each of said end walls 2 at the inner surface thereof, as shown in Fig. 5. The members 37 are provided with cylindrical portions 39 extending upwardly beyond the end walls 2 of the tray. Substantially cylindrical blocks or members 40 of insulating material, such as porcelain, are respectively adjustably connected to the upper end portions of members 37, as by being threaded thereon. Each block 40 is formed at its lower end with a petticoat portion 41 providing an annular space 42 between the lower end portion of the block and the corresponding member 37, and a laterally extending sustantially rectangular portion 43 above said petticoat portion. The portions 43 of the pair of blocks 40 at each end of the tray, closely engage the opposite sides of the bracket 35 on the adjacent battery can 10 and the wall of such can on either side of said bracket, and coöperate with the composite members consisting of bars 18 and members 19, to maintain the upper portions of the cells properly spaced from the tray and to prevent all lateral movement thereof relative to the tray. The blocks 40 are adjusted to such a position on members 37 that they will engage the metallic containers 10 of the end cells directly opposite or in alinement with the top walls 12 thereof, and consequently the liability of bending or buckling the sides of the containers when the cells tend to move endwise or sidewise of the tray, will be materially lessened.

Each of the end walls 2 of the tray is provided with a suitable handle 50 to facilitate the handling of the tray and its contained cells.

With the construction described herein, it will be seen that the cells are properly insulated and spaced from the tray at all points, and that each of the insulating members which are employed for this purpose, is provided with means, illustrated herein as a petticoat portion, for preventing liquid which may accumulate in or on the tray or on the cells from creeping across said members and bridging the spaces between the tray and cells, and thereby the short circuiting of the latter. Moreover, due to the frame-like construction of the sides of the tray and the spacing of the cells from the bottom and walls of the tray and from each other, efficient ventilation and cooling of the cells are insured. The construction described herein is also very strong and durable and is capable of standing extremely rough usage without substantial injury thereto.

The particular embodiment specifically described herein is merely illustrative of my invention, it being understood that such embodiment is subject to various changes in the size, shape and arrangement of its parts without departing from the spirit of my invention and the scope of the appended claims.

Having now described my invention, what I claim and desire to protect by Letters Patent is as follows:—

1. The combination with a battery cell, of a tray in which said cell is disposed, and means for rigidly maintaining the cell in spaced relation to the tray comprising a petticoat insulating member directly and rigidly attached both to the tray and to the cell whereby upward movement of the cell in the tray is prevented, substantially as described.

2. The combination with a battery cell, of a tray in which said cell is disposed, and means interposed between the bottoms of the cell and tray securing the cell at its bottom directly and rigidly to the bottom of the tray in spaced and insulated relation thereto, whereby upward movement of the cell in the tray is prevented, substantially as described.

3. The combination with a battery cell, of a tray therefor having a bottom and end walls, and means comprising a plurality of insulating members rigidly and directly attached to said bottom and end walls for maintaining the cell in spaced relation to said bottom and end walls, one or more of said members also being rigidly and directly attached to the cell, whereby upward movement of the cell in the tray is prevented, substantially as described.

4. The combination with a battery cell, of a tray or container therefor, and an insulating member directly and rigidly attached both to the bottom of the tray and to the cell, whereby upward movement of the cell in the tray is prevented, substantially as described.

5. A tray or container for battery cells provided with means for maintaining a battery cell therein spaced from the bottom thereof, said bottom being provided intermediate its side edges with a longitudinally and upwardly extending portion adapted to cause liquid which may accumulate on the bottom of the tray to flow therefrom, substantially as described.

6. In a tray for battery cells, means for holding a cell in the tray in spaced relation thereto, comprising an insulating member adapted to engage the cell and adjustably secured to the tray, substantially as described.

7. In a tray for battery cells, means for preventing lateral movement of a cell having a projection and disposed in the tray, comprising a pair of spaced insulating members secured to the tray and adapted to engage the cell and the opposite sides of such projection, substantially as described.

8. The combination with a series of battery cells rigidly secured together in spaced relation at their upper ends, of a tray for said cells having a bottom and end walls, means for rigidly securing the cells directly to the bottom of the tray in spaced relation thereto, and insulating means secured to the end walls of the tray and engaging the upper portions of the respective end cells of the series of cells to prevent relative lateral movement of the series of cells and the tray, substantially as described.

9. In combination, a series of cells, means rigidly securing the cells together in spaced relation at their upper ends, each end cell of the series being provided with a projection, a tray containing said series of cells, and means for preventing relative lateral movement of the cells and tray comprising a petticoat insulating device secured to each end of the tray, said devices respectively engaging said projections, substantially as described.

10. In combination, a series of cells rigidly secured together in spaced relation at their upper ends, a tray containing said series of cells, and means for preventing relative movement of said tray and cells, comprising an insulating member secured to each end of the tray and engaging a wall of the adjacent end cell of the series of cells at a point substantially in alinement with the horizontal top wall of said cell, substantially as described.

11. In combination, a series of cells rigidly connected together in spaced relation at their upper ends, a tray containing said series of cells, each end cell of such series being provided on an outer wall with a projection, and a pair of insulating members rigidly secured to each end of the tray and engaging said outer wall of the adjacent end cell and the opposite sides of the projection thereon, substantially as described.

12. In a tray for storage battery cells, a cell supporting member mounted on the bottom of the tray and adapted to be secured thereto by a headed member, said bottom being provided with an opening and said cell supporting member with a recess for such headed member, said bottom having an upwardly extending flanged portion surrounding said opening and adapted to form a seat for the head of said headed member, and said cell supporting member having a seat about the recess therein with which said flanged portion closely engages, substantially as described.

13. In combination, a metallic tray, a series of battery cells disposed therein, means for rigidly securing said cells together in spaced relation at the upper ends thereof, means for insulating said cells from the bottom of the tray and for rigidly securing the cells at their lower ends to said bottom, and insulating means coacting with the tray and the upper portions of the end cells of said series of cells for rigidly maintaining the upper portions of the series of cells in spaced relation to the tray, substantially as described.

14. A tray for battery cells having a bottom and end walls of sheet metal, and ribbed sheet metal side pieces connecting and secured to the end walls, substantially as described.

15. A tray for battery cells having a bottom and end walls formed of a single piece of sheet metal, said end walls being ribbed to stiffen and strengthen the same, substantially as described.

16. A tray for battery cells having a bottom and end walls formed of a single piece of sheet metal, and sheet metal pieces or strips connecting said end walls at the sides of the tray, substantially as described.

17. A tray for battery cells having a bottom and end walls of sheet metal, a pair of spaced sheet metal side strips or pieces at each side of the tray connecting said end walls, and a diagonal sheet metal brace connecting each pair of said side strips, substantially as described.

18. A tray for battery cells having a bottom and end walls of sheet metal, a pair of spaced sheet metal side strips or pieces at each side of the tray connecting said end walls, and a pair of diagonal sheet metal braces connecting each pair of said side strips, each pair of said braces being rigidly secured together where they cross, substantially as described.

19. A tray for battery cells having a bottom formed of sheet metal, said bottom being provided with an upwardly extending projection formed integrally therewith and extending longitudinally thereof intermediate its side edges, substantially as described.

20. A tray for battery cells having a member applied to a wall thereof, and an insulator adjustably mounted on said member for engagement with the adjacent wall of a cell in the tray, substantially as described.

21. An insulating member for maintaining a battery cell in spaced relation to a tray or container therefor, comprising a body portion provided with a petticoat depending therefrom and with a laterally extending portion above the petticoat, said laterally extending portion having a straight edge adapted to engage the wall of the cell, substantially as described.

22. An insulating member for maintaining a battery cell in spaced relation to a tray or container therefor, comprising a body portion provided with a petticoat depending therefrom and with a laterally extending portion above the petticoat, said laterally extending portion having a pair of straight edges at an angle to each other respectively adapted to engage the wall of a cell and a projection secured to said wall, substantially as described.

23. An insulating member for maintaining a battery cell in spaced relation to a tray or container therefor, comprising a body portion having a threaded socket and provided with a petticoat depending therefrom and with a laterally extending portion above the petticoat, said laterally extending portion having a straight edge adapted to engage the wall of the cell, substantially as described.

24. A device for securing together the poles of a series of battery cells comprising a member having openings for the reception of poles of such cells, said member being provided with flanges extending therefrom about said openings for maintaining the member in spaced relation to the tops of the cells when the same is applied to the poles, substantially as described.

25. The combination of a series of battery cells having poles extending through the tops thereof, means for securing said cells together comprising a member having openings through which poles of the cell respectively extend, an insulator mounted on each such pole between said member and the top of the respective cell, said member being provided with downwardly extending flanges about said openings, and devices on the portions of the poles which extend through and above said member for securing the latter in a position in which the flanges thereof tightly engage the respective insulators mounted on said poles, substantially as described.

26. A composite member for securing poles of a series of battery cells together, comprising a pair of conducting bars, each having one or more openings for the reception of said poles, and an insulator disposed between and rigidly secured to the adjacent ends of said bars, substantially as described.

27. A composite member for securing poles of a series of battery cells together, comprising a plurality of conducting bars each having one or more openings for the reception of said poles, said bars having upstanding portions at the adjacent ends thereof, an insulator disposed between the upstanding portions at each pair of adjacent ends of said bars, cushioning material between each end of each insulator and the corresponding upstanding portion, and means for removably and rigidly securing together each pair of adjacent upstanding portions and the insulator therebetween, substantially as described.

This specification signed and witnessed this 8th day of December, 1915.

THOS. A. EDISON.

Witnesses:
WILLIAM A. HARDY,
FREDERICK BACHMANN.